Patented Oct. 8, 1946

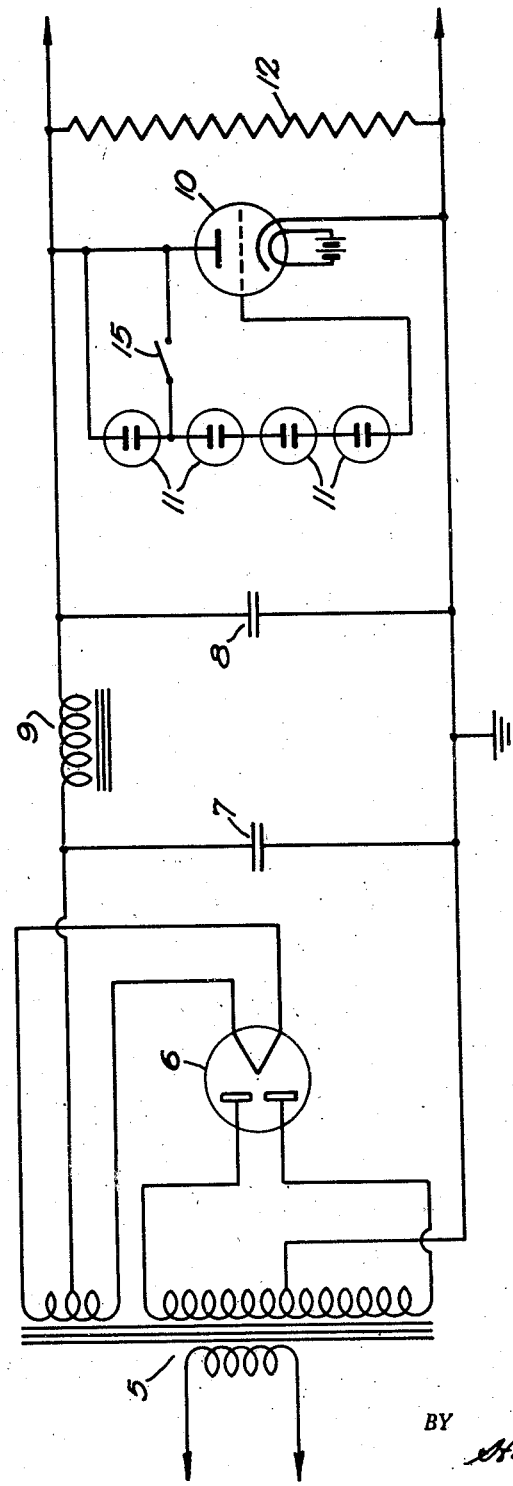

2,409,151

UNITED STATES PATENT OFFICE 2,409,151

ELECTRICAL REGULATING DEVICE

Donald H. Rogers, Jersey City, N. J., assignor to Western Electric Company, Incorporated, New York, N. Y., a corporation of New York Application February 2, 1943, Serial No. 474,477

6 Claims. (Cl. 171—312)

This invention relates to electrical regulating devices and more particularly to a voltage regulating device.

An object of the invention is to provide an effective voltage regulating device.

In accordance with one embodiment of this invention, a voltage regulating device for a current supply circuit may be provided comprising a zero bias triode vacuum tube connected across the current supply circuit and one or more interconnected gas discharge tubes connected across the plate and grid of the tube.

Other objects and advantages of this invention will be apparent from the following detailed description taken in conjunction with the drawing wherein the single figure shows a circuit diagram of a voltage regulating system constructed in accordance with one embodiment of this invention.

For some purposes in electrical apparatus and particularly in radio apparatus, it may be desirable to maintain a substantially constant voltage at varying current loads. The circuit shown and described herein provides a substantially constant voltage over a wide range of operating conditions, the operating range being readily variable by increasing or reducing the number of gas discharge tubes in the grid circuit.

Referring now to the drawing, a current rectifying and regulating circuit is there shown connected to an alternating current supply through a transformer 5. A full wave rectifier tube 6, of standard design, is connected to the secondary of the transformer 5 and a pair of filter condensers 7 and 8 are connected in parallel with the output of the rectifier tube. A filter choke 9 is connected in series on the positive side of the rectifier tube.

A triode tube 10, having a high amplification factor, is connected in parallel with the output of the rectifier 6, as shown in the drawing, and four neon tubes 11 of the type that have no resistance in the base and which have a suitable watt rating are interconnected in series and shunted across the plate and the grid of the triode tube, thus providing a relatively lower voltage on the grid than on the plate of the tube. When employing a sufficient number of series connected neon tubes, the tubes present a very high resistance. However, because of the extremely low current, the IR drop across the tubes is proportionately small and, thus, somewhat less voltage is applied to the grid of the tube 10 than is applied to the plate.

In the operation of this circuit, when an increased load is taken from the output terminals, the voltage will tend to drop due to the impedance 9 and the impedance of the supply circuit. This will decrease the potential applied to the plate of the tube 10 and the potential applied to the neon tubes is similarly reduced. This latter causes, at the same time, a reduction in the potential applied to the grid of the tube 10 and, while this reduction is substantially in the same proportion as the reduction in the voltage applied to the plate of the tube, because of the amplifying effect of the triode tube, the reduction in the voltage on the grid causes a greatly amplified reduction in the current shunted by the tube, thus tending to compensate for the increased load on the output terminals. An output resistor 12 may be connected in parallel with the output of this power supply circuit.

Since the voltage drop in the supply circuit, including the choke 9, is a function of the current through it, it will be apparent that as the load increases and, consequently, the output voltage tends to decrease, the current flowing across the triode tube is reduced in greater ratio than the output voltage, thereby reducing the current flowing through the supply circuit, and, consequently, tending to compensate for the falling off of the output voltage due to the increase in the load. On the other hand, as the load decreases and the output voltage tends to increase, the grid circuit becomes more positive with respect to the cathode in the triode tube 10 and more current will flow between the plate and the cathode, thus increasing the current flowing through the supply circuit. Consequently, the voltage drop in the supply circuit will increase and tend to compensate for the rise in voltage due to the decrease in the load. In practice the output voltage will remain substantially constant over a wide range of loads.

By increasing or reducing the number of neon tubes in the grid circuit, it will be apparent that the operating range may be altered considerably, a larger number of tubes being used where higher voltages are desired. For this purpose a switch 15 is provided to remove the fourth neon tube from the circuit if required.

While but one embodiment of this invention has been shown and described, it will be understood that many changes and modifications may be made therein without departing from the spirit and scope of the present invention.

What is claimed is:

1. A voltage regulating device comprising a current supply circuit having impedance, a triode tube connected across said supply, and a neon tube connected between the grid and the plate of said tube.

2. A voltage regulating device for a circuit having an impedance therein comprising a translating device having an anode and cathode connected in shunt across said circuit, and a grid circuit including a gas discharge device connected to said anode whereby the grid voltage will vary in accordance with the variation of the anode voltage to maintain a substantially constant voltage in the circuit being regulated.

3. A voltage regulating device comprising a current supply circuit having impedance, a translating device connected in parallel with said current supply, a grid associated with said translating device for controlling the amount of current shunted thereby, and a grid circuit including a neon tube connected to the negative side of said impedance the amount of current shunted increasing with increasing voltage, the voltage drop due to said impedance being variable with the current flowing in said translating device.

4. A voltage regulating device comprising a current supply circuit having impedance, a translating device connected in parallel with said current supply, said translating device comprising a plate, a grid and a cathode, and a grid circuit including a neon tube connected to the negative side of said impedance for maintaining the voltage on said grid below the voltage on said plate, the voltage drop due to said impedance being variable with the current flowing in said translating device.

5. A voltage regulating device comprising a current supply circuit having impedance, a translating device connected in parallel with said current supply, said translating device comprising a plate, a grid, and a cathode, and means for maintaining the voltage on said grid below the voltage on said plate, said means including a gas discharge device, the voltage drop due to said impedance being variable with the current flowing in said translating device.

6. A device to regulate the voltage of a circuit having impedance, the device comprising a tube having a plate connected to one side of the circuit and a cathode connected to the other side of the circuit and a grid between the plate and the cathode, and a neon tube connected at one side to the grid and at the other side to that side of the circuit to which the plate is connected.

DONALD H. ROGERS.